(12) United States Patent
Chan et al.

(10) Patent No.: US 9,060,352 B2
(45) Date of Patent: Jun. 16, 2015

(54) DYNAMIC CHANNEL ASSIGNMENT FOR WLAN DEPLOYMENTS WITH IEEE 802.11AC ACCESS POINTS

(75) Inventors: Douglas Chan, San Jose, CA (US); Mansoor Ahmed, Parker, TX (US); Ahmadreza Hedayat, Allen, TX (US); Brian D. Hart, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 13/584,881

(22) Filed: Aug. 14, 2012

(65) Prior Publication Data
US 2014/0050156 A1 Feb. 20, 2014

(51) Int. Cl.
*H04W 4/00* (2009.01)
*H04W 76/02* (2009.01)
(Continued)

(52) U.S. Cl.
CPC ............ *H04W 76/025* (2013.01); *H04W 16/14* (2013.01); *H04W 72/0426* (2013.01); *H04W 74/0816* (2013.01); *H04W 84/12* (2013.01)

(58) Field of Classification Search
CPC ...... H04H 20/33; H04J 11/005; H04W 84/12; H04B 1/7183; H04B 17/0057
USPC .................. 370/329, 335, 343, 252, 338, 310, 370/310.2, 330, 331, 332, 334, 341, 350, 370/443, 503, 431, 328, 336, 346
See application file for complete search history.

(56) References Cited

U.S. PATENT DOCUMENTS 6,047,175 A 4/2000 Trompower
6,065,060 A 5/2000 Liu et al.
(Continued)

FOREIGN PATENT DOCUMENTS

WO 2006045097 A2 4/2006
WO 2006069176 A2 6/2006
(Continued)

OTHER PUBLICATIONS

IEEE: IEEE P802.11n/D2.00 Draft Standard for Information Technology—Telecommunications and information exchange between systems—Local and metropolitan area networks—Specific requirements—Part 11: Wireless LAN Medium Access Conrol (MAC) and Physical Layer (PHY) specificaitons: Amendment: Enhancements for Higher Throughput Feb. 2007, pp. 199-202.
(Continued)

*Primary Examiner* — Kwang B Yao
*Assistant Examiner* — Ricardo Castaneyra
(74) *Attorney, Agent, or Firm* — Edell, Shapiro & Finnan LLC

(57) ABSTRACT

Techniques are provided for selecting channels for use by access points operating in a wireless local area network. Metrics are computed for at least one set of radio frequency (RF) channels, wherein the set of RF channels comprises at least two RF channels in a frequency band that are available for use by a wireless network for a wider bandwidth mode that combines bandwidth of two or more RF channels. Alignment of individual primary and secondary RF channels is determined in the set of RF channels for operation of at least first and second wireless networks. A bias is applied to the metrics for each RF channel that is a member of the set of RF channels for the primary channel depending on alignment of the primary and secondary channels of the respective first and second wireless networks to produce adjusted metrics, based on which RF channels are assigned.

36 Claims, 9 Drawing Sheets

(51) Int. Cl.
*H04W 16/14* (2009.01)
*H04W 72/04* (2009.01)
*H04W 74/08* (2009.01)
*H04W 84/12* (2009.01)

(56) References Cited

U.S. PATENT DOCUMENTS

| | | |
|---|---|---|
| 6,215,982 B1 | 4/2001 | Trompower |
| 6,829,486 B2 | 12/2004 | McKenna et al. |
| 7,075,906 B2 | 7/2006 | Douglas et al. |
| 7,197,013 B2 | 3/2007 | Douglas et al. |
| 7,280,607 B2 | 10/2007 | McCorkle et al. |
| 7,363,008 B2 | 4/2008 | Hassan et al. |
| 7,372,866 B2 | 5/2008 | Jang et al. |
| 7,558,592 B2 | 7/2009 | Hart et al. |
| 7,573,857 B1 | 8/2009 | Radhakrishnan et al. |
| 7,593,356 B1 | 9/2009 | Friday et al. |
| 7,903,607 B2 * | 3/2011 | Utsunomiya et al. ......... 370/329 |
| 8,125,919 B1 | 2/2012 | Khanka et al. |
| 8,155,482 B2 | 4/2012 | Chan et al. |
| 2002/0010939 A1 | 1/2002 | Fujita et al. |
| 2002/0101888 A1 | 8/2002 | Keck et al. |
| 2002/0174377 A1 | 11/2002 | Davies |
| 2003/0054827 A1 | 3/2003 | Schmidl et al. |
| 2004/0054774 A1 | 3/2004 | Barber et al. |
| 2004/0062273 A1 | 4/2004 | Frank et al. |
| 2006/0159003 A1 * | 7/2006 | Nanda et al. ................ 370/203 |
| 2006/0165103 A1 | 7/2006 | Trudeau et al. |
| 2006/0182073 A1 | 8/2006 | Pani et al. |
| 2007/0253385 A1 | 11/2007 | Li et al. |
| 2007/0287390 A1 | 12/2007 | Murphy et al. |
| 2009/0067403 A1 | 3/2009 | Chan et al. |
| 2010/0067379 A1 * | 3/2010 | Zhao et al. ................... 370/235 |
| 2010/0091716 A1 | 4/2010 | Bonta et al. |
| 2010/0189199 A1 | 7/2010 | Lou et al. |
| 2010/0222065 A1 | 9/2010 | De Pasquale et al. |
| 2010/0246554 A1 * | 9/2010 | Alapuranen et al. .......... 370/343 |
| 2010/0322141 A1 | 12/2010 | Liu et al. |
| 2011/0075613 A1 | 3/2011 | Yuan |
| 2011/0116401 A1 * | 5/2011 | Banerjea et al. ............. 370/252 |
| 2011/0134866 A1 | 6/2011 | Frank et al. |
| 2011/0222486 A1 | 9/2011 | Hart |
| 2011/0243020 A1 | 10/2011 | Ponnuswamy |
| 2011/0305288 A1 | 12/2011 | Liu et al. |
| 2012/0026997 A1 | 2/2012 | Seok et al. |
| 2012/0052900 A1 | 3/2012 | Liu et al. |
| 2012/0082040 A1 | 4/2012 | Gong et al. |
| 2012/0147804 A1 | 6/2012 | Hedayat et al. |
| 2012/0163331 A1 | 6/2012 | Chan et al. |
| 2012/0182963 A1 | 7/2012 | Kneckt et al. |
| 2012/0207106 A1 * | 8/2012 | Banerjea et al. ............. 370/329 |
| 2012/0224483 A1 | 9/2012 | Babiarz et al. |
| 2013/0010597 A1 | 1/2013 | Liu et al. |
| 2013/0201863 A1 | 8/2013 | Chan et al. |

FOREIGN PATENT DOCUMENTS

| | | |
|---|---|---|
| WO | 2006045097 A3 | 8/2006 |
| WO | 2011135392 A1 | 11/2011 |

OTHER PUBLICATIONS

Devin Akin: "802.11n 20/40 MHz BSS Mode Rules" CWNP Wireless Certification and Wireless Training, Aug. 29, 2007.

International Search Report and Written Opinion in counterpart International Application No. PCT/US2013/054491, mailed Feb. 24, 2014, 7 pages.

Yu, et al., "An Adaptive Radio Resource Management Technique for APs in WLANs," IEEE International Conference on Networks (ICON'04), Nov. 2004, pp. 85-91.

IEEE, "IEEE P802.11ac/D3.0—Draft Standard Information Technology—Telecommunications and Information Exchange Between Systems—Local and Metropolitan Area Networks-Specific Requiements—Part 11: Wireless LAN Medium Access Control (MAC) and Physical Layer (PHY) Specifications—Amendment 4: Enhancements for Very High Throughput for Operations in Bands Below 6 GHz", pp. i-360.

Kneckt, "Overlapping BSS Co-Existence," IEEE 802.11-10/1303r6, Nov. 11, 2010, pp. 1-19.

* cited by examiner

DYNAMIC CHANNEL ASSIGNMENT FOR WLAN DEPLOYMENTS WITH IEEE 802.11AC ACCESS POINTS

TECHNICAL FIELD

The present disclosure relates to channel assignment for wireless local area networks.

BACKGROUND

The IEEE 802.11ac standard is the upcoming next-generation wireless local area network (WLAN) amendment that is highly anticipated by the wireless industry. The 802.11ac amendment is designed to provide a significant increase in achievable data rates.

A new and important feature introduced into by the IEEE 802.11ac amendment is operation in channel-widths of 80 MHz, 160 MHz and 80+80 MHz. These channels are significantly wider than the current 20 or 40 MHz wide channels of IEEE 802.11n. Consequently, dynamic channel assignment schemes need to handle and optimize to the new wider channelizations of IEEE 802.11ac, yet account for the coexistence with legacy equipment that operates according to the 802.11n standard.

DESCRIPTION OF EXAMPLE EMBODIMENTS

Overview

Techniques are provided for selecting channels for use by access points operating in a wireless local area network. Metrics are computed for at least one set of radio frequency (RF) channels, wherein the set of RF channels comprises at least two RF channels in a frequency band that are available for use by a wireless network for a wider bandwidth mode of operation that combines bandwidth of two or more RF channels. The metrics are based on activity from devices in the set of RF channels. Alignment of individual primary and secondary RF channels is determined in the set of RF channels for operation of at least first and second wireless networks, at least one of which operates in a wider bandwidth mode. A primary channel is a set of one or more RF channels that is a smaller denomination of RF channels used by a wireless network when it is not operating in a wider bandwidth mode and a secondary channel is one or more RF channels used in conjunction with a primary channel when a wireless network is operating in a wider bandwidth mode. A bias is applied to the metrics for each RF channel that is a member of the set of RF channels for the primary channel depending on alignment of the primary and secondary channels of the respective first and second wireless networks to produce adjusted metrics. RF channels are assigned to primary and secondary channels for the first and second wireless networks based on the adjusted metrics.

EXAMPLE EMBODIMENTS

Figure 1:
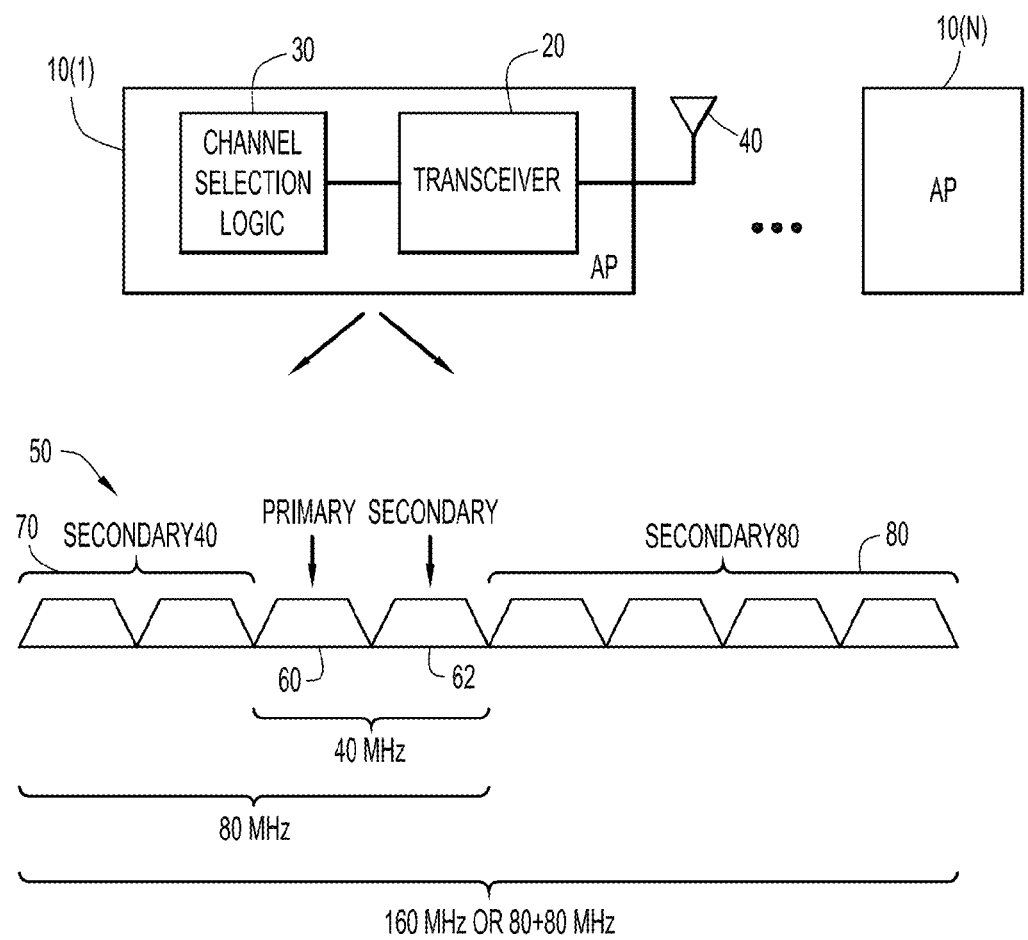
FIG. 1 is an example block diagram of multiple wireless local area network access point devices configured to operate with wider channelizations.

Referring first to FIG. 1, a diagram is shown of a plurality of wireless network devices 10(1)-10(N), each being, e.g., a wireless local area network (WLAN) access point (AP), comprising a transceiver 20, controlled by channel selection logic 30. The AP 10(1) transmits and receives radio frequency (RF) signals via antenna 40.

FIG. 1 also shows a frequency spectrum in which the APs 10(1)-10(N) may transmit RF signals to serve one or more wireless client devices, also called stations (STAs), in basic service set (BSS) or wireless network. The clients are not shown in FIG. 1, for simplicity.

The spectrum 50 is broken out to illustrate the various possibilities for channelization, accounting for the advanced channelization schemes of the IEEE 802.11ac amendment as well as IEEE 802.11n. A "primary channel" is a set of one or more RF channels that is a smaller denomination of RF channels that a device uses when it is not operating in a wider bandwidth mode. A "secondary channel" is one or more RF channels that a device uses in conjunction with a primary channel when it is operating in a wider bandwidth mode. For example, if a wider bandwidth mode is 160 MHz, then the primary channel may be a 20 MHz channel (P20), a 40 MHz channel (P40) and an 80 MHz primary channel (P80). Thus, there are multiple possible wider bandwidth modes, each with a different bandwidth: 40 MHz, 80 MHz and 160 MHz.

In one example, a single RF channel is 20 MHz. According to IEEE 802.11n, an RF channel may serve as a primary channel 60 and an adjacent second RF channel may serve as a secondary channel 62. According to IEEE 802.11n, an AP may aggregate primary channel 60 and secondary channel 62 to transmit in 40 MHz of bandwidth.

However, IEEE 802.11ac allocates two 20 MHz RF channels adjacent to the primary channel 60 for use as a 40 MHz secondary channel, called secondary40, shown at reference numeral 70. In addition, 802.11ac allocates four 20 MHz RF channels adjacent to the secondary channel 62 for use as an 80 MHz secondary channel, called secondary80, shown at reference numeral 80. Thus, further channelization options include a combination of the primary and secondary channels 60 and 62 with the secondary40 channel 70, to achieve 80 MHz of bandwidth, and a combination of the primary and secondary channels 60 and 62 with the secondary40 channel 70 and the secondary80 channel 80 to achieve 160 MHz of contiguous bandwidth, or a non-contiguous 80+80 MHz mode that splits the 160 MHz channel into two.

Depending on the proximity of various APs 10(1)-10(N) to each other and on the channels that they use, they may be overlapping BSSs (OBSS) in that they are operating on the same channels within sufficient proximity to each other that they could interfere with each other.

The coexistence issues present in the 802.11ac channelization are somewhat similar to those that are present in 802.11n. Because of asymmetric channel access rules for primary and secondary channels, it is desirable to avoid having the primary and secondary 20 MHz channels misaligned to maintain fair channel access among OBSSs of various channel widths. Thus, due to the extension to 80 MHz and 160 (and 80+80) MHz channels, in 802.11ac there are the additional coexistence scenarios of how to allocate the secondary40 and secondary80 channels, shown at 70 and 80 in FIG. 1.

A general level of constructive coexistence among OBSSs is used based on these general criteria:

Fair channel access;

Fairness between 802.11ac and 802.11ac channel access is neutral;

Fairness between 802.11ac and legacy equipment (802.11n and 802.11a) channel access is neutral;

Number of hidden nodes decreases;

Number of collision decreases; and

Overall performance and efficiency increases.

Figure 2:
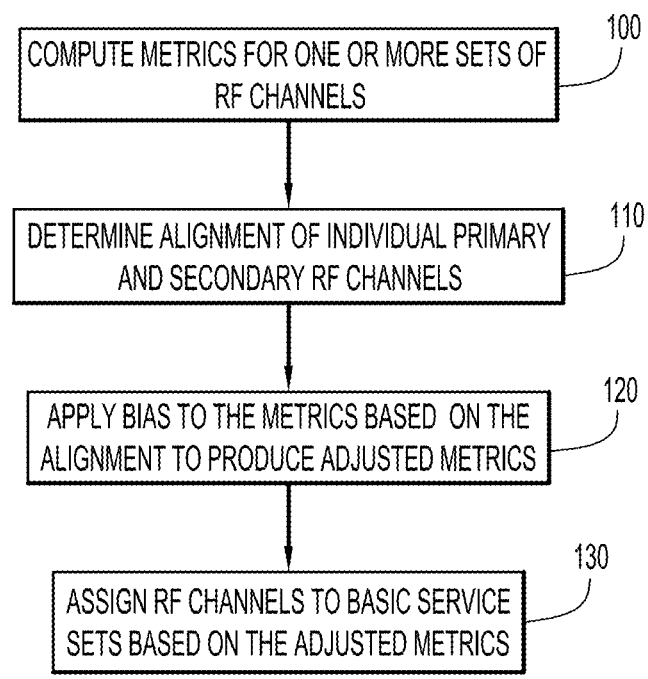
FIG. 2 is a flow chart depicting operations performed to assign channels to multiple overlapping basic service sets to achieve coexistence in the wider channelizations.

FIG. 2 illustrates a flow chart that generally depicts the operations associated with the channel selection logic 30 in channel assignment to achieve a desired level of constructive coexistence. At 100, metrics are computed for at least one (candidate) set of RF channels, wherein the set of RF channels comprises at least two (contiguous or non-contiguous) RF channels in a frequency band that are available for use by a wireless network for a wider bandwidth mode of operation that combines bandwidth of two or more (contiguous or non-contiguous) RF channels. The metrics are based on activity from devices in the set of RF channels, and are described in more detail hereinafter.

At 110, a determination is made of the alignment of individual primary and secondary RF channels in the (candidate) set of RF channels for operation of at least first and second wireless networks, at least one of which operates in a wider bandwidth mode. As explained above, a primary channel is a set of one or more RF channels that is a smaller denomination of RF channels that a device uses when it is not operating in a wider bandwidth mode and a secondary channel is one or more RF channels that a device uses in conjunction with a primary channel when it is operating in a wider bandwidth mode. At 120, a bias is applied to the metrics for each RF channel that is a member of the set of RF channels for the primary channel depending on alignment of the primary and secondary channels of the respective multiple wireless networks to produce adjusted metrics. As will become more apparent from the following description, the bias is applied so as to bias against channel assignments based on resulting relative interference level. In other words, channel assignments that result in higher interference levels are given bias values to more aggressively bias against such channel assignments, whereas channel assignments that result in lower interference levels are given bias values that less aggressively bias against such channel assignments. At 130, RF channels are assigned to primary and secondary channels of the wireless networks based on the adjusted metrics.

The metric (cost metric) referred to at 110 can be calculated from a variety of RF measurements that would affect a channel's quality for wider bandwidth operation mode. Examples of RF measurements include:

1. The ambient noise floor in dBm.

2. Receive signal strength information (RSSI) strengths in dBm and average traffic loads of RF signals from known overlapping BSSs.

3. RSSI strengths in dBm and average traffic load of RF signals that the device under consideration would contribute to a candidate set of channels.

4. RSSI strengths in dBm and average duty cycles of unidentified RF signals detected in a candidate set of channels.

5. All of the foregoing measurements on nearby channels but attenuated appropriately based on their separations in frequency from each other.

Based on simulations and analysis, it has been determined that the general level of constructive coexistence increases between two OBSSs in increasing order of the following scenarios:

1. Primary and secondary20 channels mismatched (which under certain circumstances becomes illegal per the standard).

2. Primary channel on secondary40 and secondary80 channels.

3. Primary channels aligned.

Since the channel assignments and the primary alignments are controlled via penalties (biases), penalty bias values are applied to the cost metrics when the above 3 scenarios occur in the order: B1>=B2>=B3, wherein Penalty B1 is applied for scenario 1, B2 for scenario 2, and B3 (or none) for scenario 3. The specific values of the penalties are determined via simulations and empirical measurements.

It should be understood that the biases are determined to optimize the selection of a 20 MHz channel versus 40 MHz, versus 80 MHz and versus 160 MHz, and also biases to optimize the selection of primary alignment and non-alignment (with respect to secondary channels) for all of these scenarios, e.g., selection of 20 MHz and 160 MHz, and not just 40 MHz versus 80 MHz.

Reference is now made to FIGS. 3A-3D and 4A-4D. In these figures, the following terminology is defined:

P=Primary channel (20 MHz)

S20=Secondary channel (20 MHz); aka "Secondary20"

S40=Secondary40 channel (40 MHz)

Figure 3A:
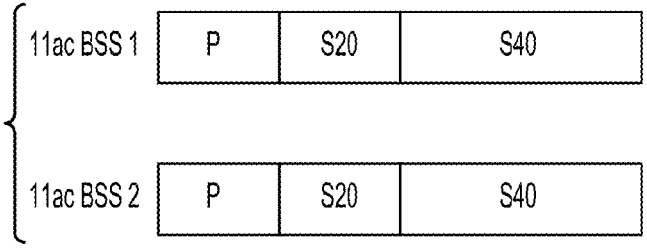
FIGS. 3A-3D illustrate an example of a first set of coexistence scenarios.
Figure 3B:
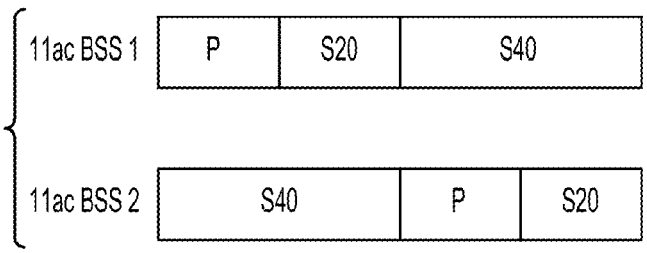
Figure 3C:
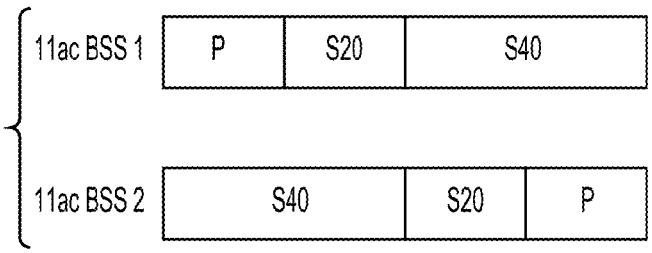
Figure 3D:
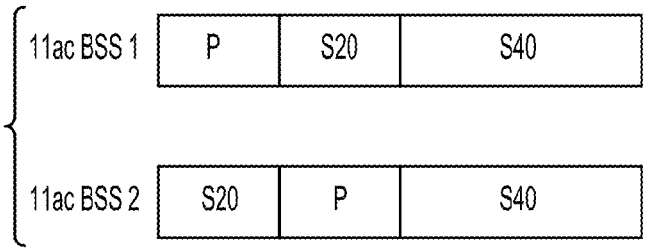

FIGS. 3A-3D illustrate examples for coexistence between two 80 MHz 802.11ac BSSs. In FIG. 3A, the primary channels of the two BSSs are aligned. Minimal or no bias should be applied against this scenario. In FIGS. 3B and 3C, the primary channel of each BSS is aligned with the secondary40 channel of the other BSS. A medium or moderate bias should be applied against this scenario. The purpose of illustrating FIGS. 3B and 3C separately is to show that the placement of the primary channel does not matter in those scenarios. In FIG. 3D, the primary and secondary channels are misaligned. The strongest/most aggressive bias is applied against this scenario.

Figure 4A:
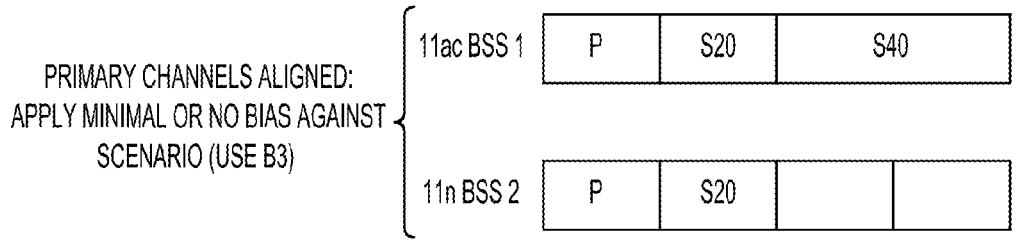
FIGS. 4A-4D illustrate an example of a second set of coexistence scenarios.
Figure 4B:
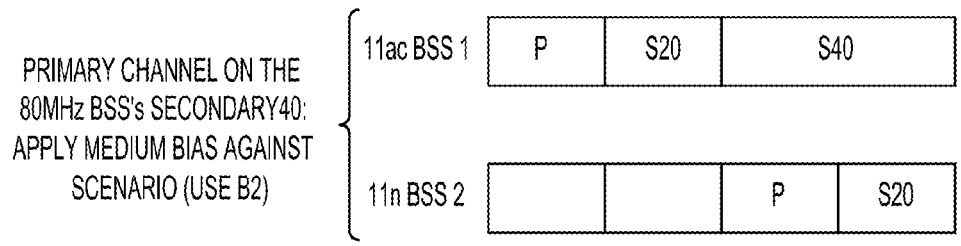
Figure 4C:
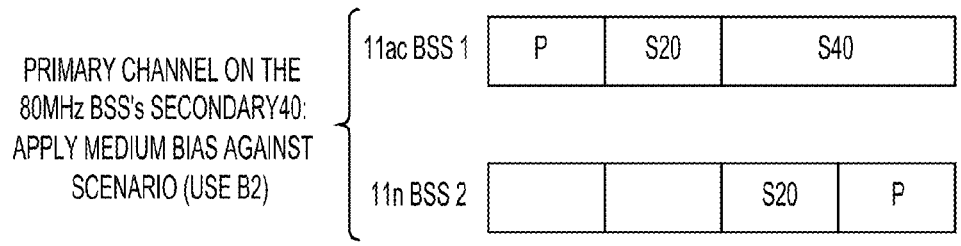
Figure 4D:
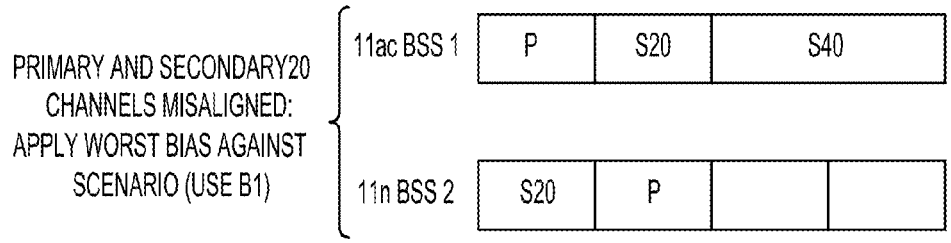

FIGS. 4A-4D illustrate examples for coexistence between an 80 MHz 802.11ac BSS and a 40 MHz 802.11n BSS. FIG. 4A shows the scenario where the primary channels of the two BSSs are aligned, and minimal or no bias should be applied against this scenario. FIGS. 4B and 4C show the situation where the primary channel of the 802.11n BSS is aligned with the secondary40 channel of the other BSS. Again, the placement of the primary channel does not matter in the scenarios of FIGS. 4B and 4C. FIG. 4D shows the scenario in which the primary and secondary channels of the two BSSs are misaligned. The most aggressive bias is applied against this scenario. The biasing schemes depicted by FIGS. 4A-4D are applicable even if BSS2 is, for example, a 40 MHz 802.11ac BSS.

Thus, the scenarios depicted in FIGS. 3D and 4D are examples of scenarios in which a first bias value would be applied in order to bias against assignment of primary and secondary channels for a first wireless network such that the primary channel of the first wireless network would coincide with the secondary channel of a second wireless network and a secondary channel of the first wireless network would coincide with the primary channel of the second wireless network. FIGS. 3B, 3C, 4B and 4C are examples of scenarios in which a second bias value would be applied in order to bias against assignment of primary and secondary channels for the first wireless network such that the primary channel of the first wireless network would coincide with a secondary channel of the second wireless network, where secondary channel of the second wireless network comprises two or more contiguous RF channels aggregated together, wherein the first bias value is greater than the second bias value, which in turn is greater than the third bias value (the third bias value being applicable to the scenarios of FIGS. 3A and 4A).

The scenarios of FIGS. 3A-3D and 4A-4D are example scenarios in which the two BSSs are managed by the same management entity so that changes to the channel assignment in one or both BSSs are made with knowledge and intent of such changes. This may not always be the case. It is possible that one of the BSSs, e.g., BSS2, is managed by a different management entity that is used to manage the other BSS, e.g., BSS1. A BSS that is managed by a different management entity is referred to herein as a so-called "rogue" BSS or rogue AP.

The biasing schemes described herein can also account for the presence of rogue APs and their primary channels. Bias values are applied when an AP detects a rogue OBSS whose primary channel is in a position relative to the AP's primary channel as described above in the example scenarios of FIGS. 3A-3D and 4A-4D. In general, the corresponding set of bias values when such scenarios arise are, respectively: R1, R2 and R3, where R1>=R2>=R3>=R4 and that R4 could equal to 0.

Adaptive Penalty for Misalignment: Bias Values Relative to CCA Thresholds

Described above are techniques to apply a constant bias value whenever a corresponding event is identified, thereby avoiding certain channel alignment scenarios with a constant likelihood. This is a "quantized" approach because the configuration may have a range of effects depending on the receive signal strength information (RSSI) between the APs. However, simulations have shown that in certain RF conditions, as based on RSSI of the involved APs, it is better to avoid certain alignments with higher likelihood and conversely it may be favorable to allow certain alignments. For example, if the RF distance between the APs yields an RSSI in the vicinity of the clear channel access (CCA) threshold for the secondary20 or secondary40, then the throughput of the BSS on these secondary channels will suffer more significantly.

Therefore, alignment of the primary channel on a secondary40 channel should be avoided more vigorously if the RSSI between the OBSSs is close to the CCA threshold for secondary40 channels. Likewise, alignment of a primary channel with a secondary20 channel should be avoided if the RSSI is near the CCA threshold for the secondary20 channels. A similar approach can be extended for alignments of primary channels with respect to secondary80 channels. In effect, a variable bias/penalty, based on RSSI, is used. Thus, the computing of the aforementioned first, second and third biases (B1, B2, and B3) is based on the receive signal strength of a first wireless network relative to a CCA threshold of a secondary channel of a second wireless network.

Figure 5:
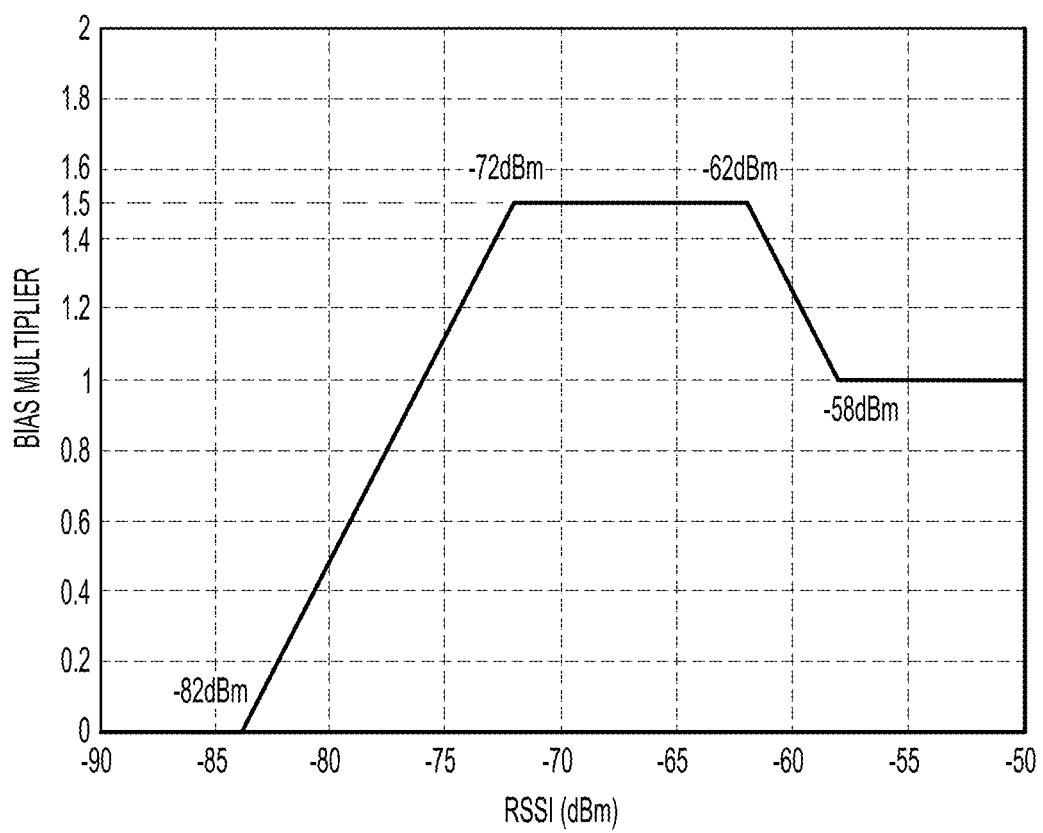
FIG. 5 is plot for a transfer function used to map receive signal strength to a corresponding penalty bias to account for a clear channel access threshold of secondary channels.

The mapping between RSSI and the corresponding penalty bias can be any general transfer function as deemed appropriate to the scenario. A general plot of this idea and the candidate transfer function in the form of a piecewise linear function is shown in FIG. 5. The y-axis therein shows a normalized penalty which can be translated to specific dB values. Note that the peak of the penalty occurs at the presumed CCA threshold.

There are variations envisioned. For example, the exact behavior of OBSSs depends on the type of APs as well as the types of clients. When the client type is the same as the AP type, then for an 802.11ac AP, the bias should peak at the CCA of its secondary20/secondary40 channel, e.g., −72 dBm. However, for an 802.11n AP, the bias should peak at the CCA of the secondary channel, e.g., −62 dBm.

Since the clients types could also be mixed, the bias can accommodate for the varying client types as well. For instance, when the AP is an 802.11ac AP and the majority of clients are 802.11n clients, in order to protect the uplinks of the 802.11n clients, the 802.11ac AP applies a bias that peaks at −62 dBm. For example, consider the case of an 802.11ac AP and a neighboring 802.11ac AP, but the clients are 802.11n clients. In order to avoid collision due to the insensitive CCA of the secondary channel, the 802.11ac AP under consideration needs to be steered away from the channel the neighbor is using up to −62 dBm. However, in order to accommodate all the possible permutations of the APs and client mixes, a very complex decision mechanism would be needed. Therefore, another embodiment is to use a non-linear curve with an "elongated hump" (elongated peak value region) from −72 to −62 dBm for all APs. The peak bias values may be, for example, set to 1.5.

Regardless of the mathematical construct used to derive the bias values, the general relation between bias values described above will still be satisfied, i.e., B1>=B2>=B3 and R1>=R2>=R3.

Avoiding Undesirable Channel Adjacency Situations

In some OBSS scenarios, adjacent channel interference from one BSS might cause another to detect a channel as being busy. Since 802.11n uses an insensitive CCA threshold on its secondary20 channel (where the insensitivity is relative to that of the 802.11ac secondary20 CCA threshold), this could cause unfairness towards an 802.11ac BSS, i.e., where an 802.11ac BSS detects CCA as being busy, whereas an 802.11n BSS would not detect its secondary20 channel as being busy. On the other hand, due to the 802.11n channel backoff rules, an 802.11n BSS may be forced to defer channel access longer than necessary when an adjacent BSS operates according to 802.11ac.

Figure 6:
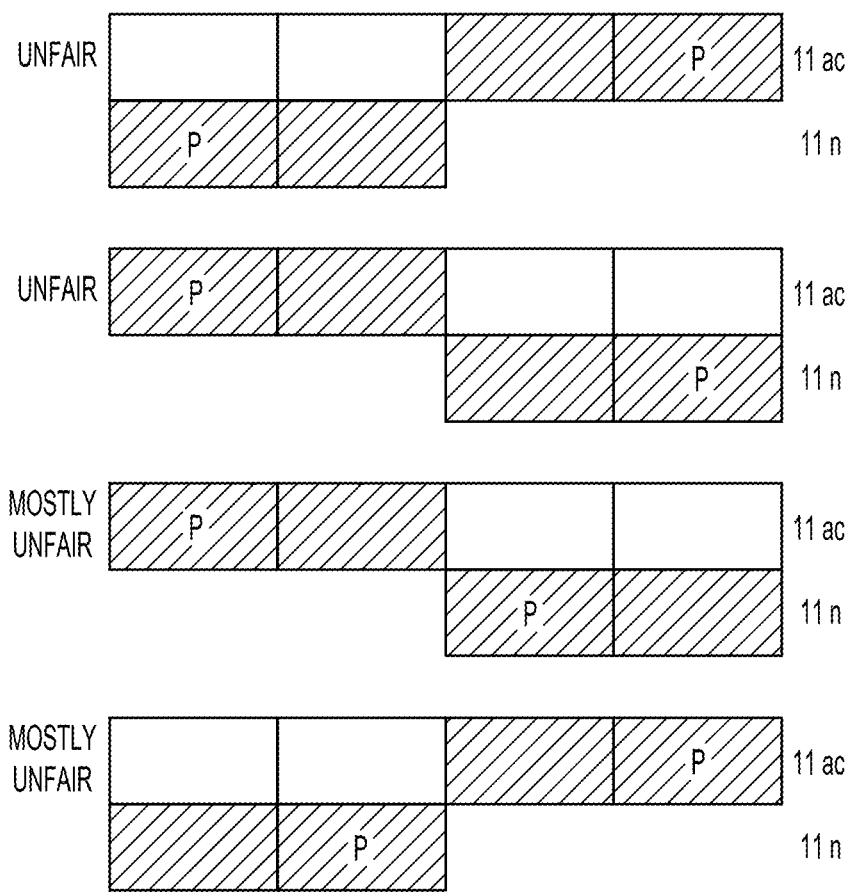
FIGS. 6 and 7 illustrate channel adjacency scenarios for which bias values are applied.
Figure 7:
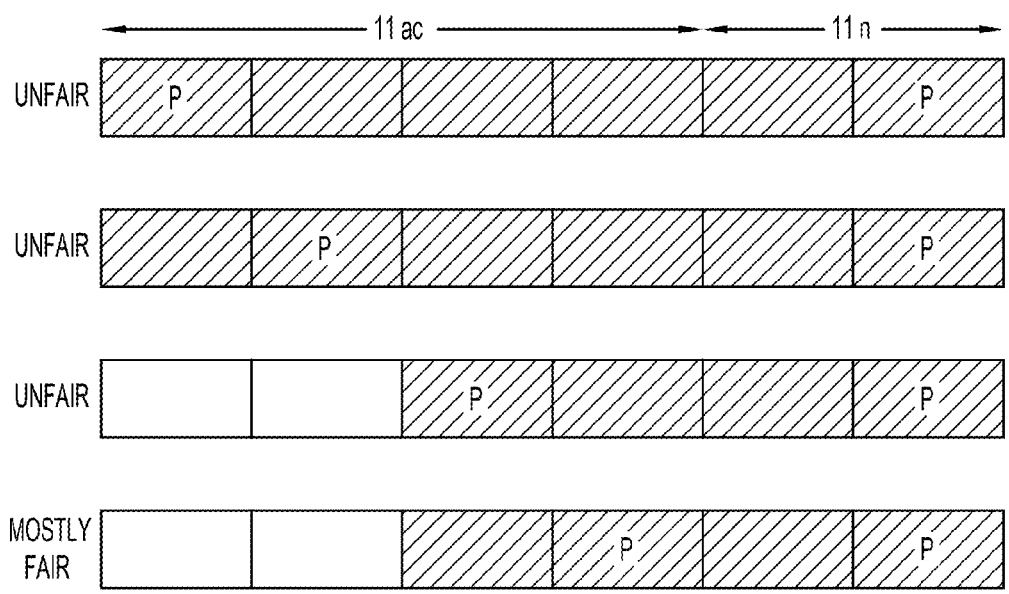

Not all possible primary-secondary channel adjacency situations cause unfairness. FIGS. 6 and 7 identify and illustrate the unfair cases from all the possible 802.11n/802.11ac coexistence scenarios, where each individual block is a 20 MHz channel. Of these unfair cases, they are further categorized by two degrees of unfairness, "Unfair" or "Mostly Unfair":

"Unfair" denotes cases when the 802.11n BSS will cause an adjacent 802.11ac BSS to defer transmission on its channel to the 802.11n BSS (due to the 802.11n BSS's secondary channel CCA threshold being relatively less sensitive to that of the primary channel) such that the 802.11n BSS has an unfairly larger portion of time using the channel. Moreover, the 802.11n BSS may transmit while the adjacent 802.11ac BSS is already transmitting, thus creating likely packet collisions to both BSSs, yet hurting the performance of the 802.11ac BSS because it yields to the 802.11n BSS for channel access.

"Mostly Unfair" denotes cases when either BSS defers access to their respective channels in a fair manner when the other BSS is transmitting on the channel, except that an 802.11n BSS will defer access to its channel for a longer duration than the adjacent 802.11ac BSS (due to the channel backoff rules of the 802.11n BSS).

These two categories can be generalized via the following rules:

1. If an 802.11n AP's secondary20 channel is adjacent to either (i) an 802.11ac AP's secondary20 channel when the 802.11ac AP is operating a 40 MHz BSS or (ii) an 802.11ac AP's secondary40 channel when the 802.11ac AP is operating an 80 MHz BSS, then this is an "Unfair" scenario.

2. If the primary channel of an 802.11n AP or an 802.11ac AP is adjacent to a secondary channel of an 802.11ac or an 802.11n AP, respectively, then this is a "Mostly Unfair" scenario.

In order to proportionately steer the channel assignments clear of these occurrences, a bias value of A1 is applied to the metrics for the Unfair configurations, while a bias value of A2 (where A2<=A1) is applied for the Mostly Unfair cases. Note that there is no unfairness if the BSSs do not receive each other's signals in the range of −82 to −62 dBm, so these biases should not be applied if the neighboring APs' RSSI do not fall in this range. A similar bias assignment scheme is used for configurations involving rogue BSSs that may lead to the above scenarios.

In summary, the bias values applied to channel assignments may depend on adjacency of primary and secondary channels of a first wireless network with respect to primary and secondary channels of a second wireless network. A first bias value is applied against assignment of a secondary channel of the first wireless network to an RF channel that is adjacent to the secondary channel of the second wireless network that is operating in a wider bandwidth mode, and a second bias value is applied against assignment of either a primary channel of the first wireless network that is adjacent to a secondary channel of the second wireless network or primary channel of the second wireless network that is adjacent to a secondary channel of the first wireless network. The second bias value is less than or equal to the first bias value, and the first wireless network may be an IEEE 802.11n wireless network and the second wireless network may be an IEEE 802.11ac wireless network. The first and second wireless networks may be managed by the same management entity, or either of the first and second wireless networks may be managed by a different management entity, i.e., a rogue network.

Normalization of DCA Cost Metrics

The penalty bias described above is applied to the cost metric of a channel when it is involved in one of the identified coexistence scenarios. In order to determine the final set of channels to use and the location of the primary channel therein, an aggregated cost metric is computed for each possible channel combination based on the cost metric of the individual channels and their role as a primary channel (or not). The channel assignments are then based on these aggregated cost metrics.

In one example, a weighted average of primary, secondary20, and secondary40 channel cost metrics is computed, with two possible sets of weights:

Weight Set 1: Emphasis on primary channel. For example, 62.5% for the primary and 12.5% for the remaining non-primary channels.

Weight Set 2: Emphasis on "primary40" channel. For example, 50% for the primary, 25% for the secondary20 and 12.5% for the remaining channels in secondary40.

Different usage scenarios are envisioned. When the 802.11ac BSS occasionally switches to 40 MHz operations, then Weight Set 2 will yield a more appropriate aggregate cost metric. In yet another variation, the particular set of weights could also be chosen dynamically depending on the desired usage.

To summarize, the adjusted metrics may be normalized by applying weights to the adjusted metrics to emphasize selection of primary channels. Normalizing may involve computing a weighted average of primary and secondary channels by applying a greater weight for selection of a primary channel over secondary channels and such that secondary channels are given progressively less weight as their bandwidth increases.

Default Channel Width

It may be desirable to ensure that each BSS is capable of the highest data rates offered by the AP as the default setting. This means legacy APs are assigned their maximum channel widths possible (e.g., 802.11n APs are assigned 40 MHz). If the greatest channel width for a particular 802.11ac AP is 80 MHz, then this will be its default channel width. In other words, the assignment of channels is made so that multiple RF channels are assigned to wireless networks so as to allow a bandwidth needed to support the highest data rates capable by a wireless network.

Dynamic Frequency Selection Scenarios

It has been reported that there is a percentage of clients that do not support dynamic frequency selection (DFS) of channels. Such clients require a BSS operating in a non-DFS channel. Therefore, in order to accommodate such clients, whenever a BSS is assigned to a channel allocated for DFS, a neighboring BSS should be steered toward a non-DFS channel (a channel not allocated for DFS). This can be accomplished by biasing, by a small value, a BSS toward a non-DFS channel. For example, a small bias value, 'B_dfs', is added against selection of a DFS channel for every neighbor BSS that is currently operating in a DFS channel. Furthermore, the application of the bias 'B_dfs' can be constrained for N strongest neighbor BSSs whose RSSI is above a certain threshold, 'T_dfs'. For example, when N=4, and 'T_dfs'=−75 dbm, the 4 strongest neighbors are determined and for every one with RSSI>−75 dbm, the bias 'B_dfs' is applied if the neighbor is operating on a DFS channel. To summarize, a bias is applied to assign a first wireless network to an RF channel not required for DFS when the second wireless network neighboring the first wireless network is operating on an RF channel that is required for DFS. Moreover, a bias with a greater value is applied when assigning the first wireless network to an RF channel not required for dynamic frequency selection if the second and one or more additional wireless networks neighboring the first wireless network are operating on RF channels requiring dynamic frequency selection.

Figure 8:
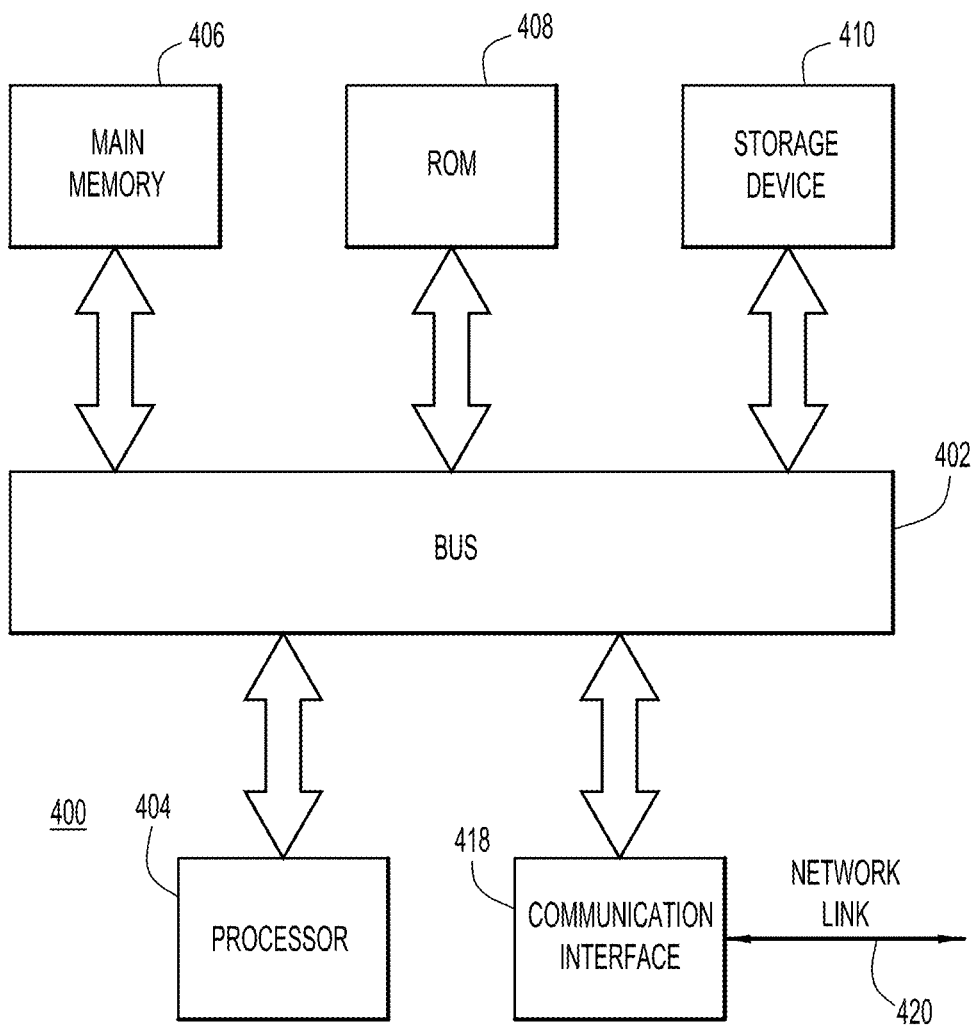
FIG. 8 is an example block diagram of an apparatus in which the channel assignment computations may be made.

FIG. 8 is block diagram of a computer system 400 upon which an example embodiment can be implemented. Computer system 400 includes a bus 402 or other communication mechanism for communicating information and a processor 404 coupled with bus 402 for processing information. Computer system 400 also includes a main memory 406, such as random access memory (RAM) or other dynamic storage device coupled to bus 402 for storing information and instructions to be executed by processor 404. Processor 404 may be a microprocessor or microcontroller, for example. Main memory 406 also may be used for storing a temporary variable or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

An aspect of the example embodiment is related to the use of computer system 400 for selecting channels for a wider bandwidth operation mode. According to an example embodiment, selecting channels for a wider bandwidth system is provided by computer system 400 in response to processor 404 executing one or more sequences of one or more instructions contained in main memory 406 in order to perform the operations of the channel selection logic 30 (FIG. 1) as described above in connection with FIGS. 1-7. Such instructions may be read into main memory 406 from another computer-readable storage medium, such as storage device 410. Execution of the sequence of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry (e.g., fixed digital logic gates) may be used in place of or in combination with software instructions to implement an example embodiment. Thus, embodiments described herein are not limited to any specific combination of hardware circuitry and software.

The term "computer-readable medium" as used herein refers to any physical device medium that participates in providing instructions to processor 404 for execution. Such a medium may take many forms, including but not limited to non-volatile media, volatile media. Non-volatile media include for example optical or magnetic disks, such as storage device 410. Volatile media include dynamic memory such as main memory 406. Transmission media include coaxial cables, copper wire and fiber optics, including the wires that comprise bus 402. Common forms of (non-transitory) computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 404 for execution. For example, the instructions may initially be borne on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406 from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a network, such as a WLAN or LAN. For example, communication interface 418 may be a wireless transceiver or a network card such as an Ethernet card, in other embodiments communication interface 418 may be a modem to provide a data communication connection to a corresponding type of telephone line. In any such implementation, communication interface 418 sends and receives electrical, electromagnetic, or optical signals that carry digital data streams representing various types of information.

Computer system 400 can send messages and receive data, including program codes, through communication interface 418. In accordance with an example embodiment, one such downloaded application provides for selecting channels as described herein. The received code may be executed by processor 404 as it is received, and/or stored in storage device 410, or other non-volatile storage for later execution.

Figure 9:
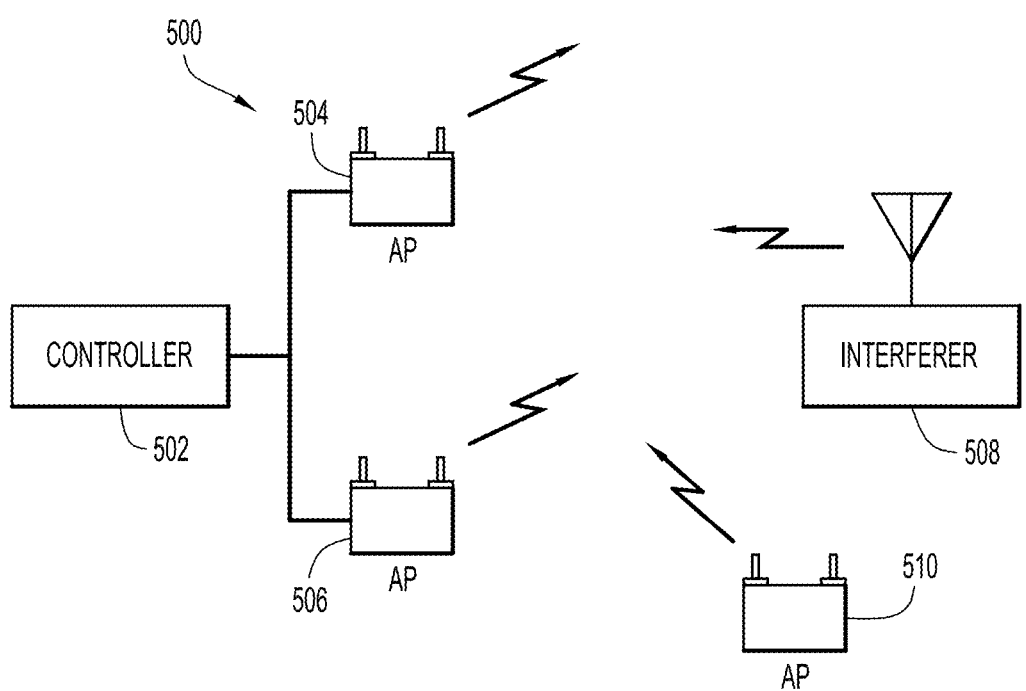
FIG. 9 is an example block diagram of wireless network environment in which the channel assignment techniques may be used.

FIG. 9 illustrates an example network 500 upon which an example embodiment may be implemented. Network 500 comprises a management device (the aforementioned "management entity") or controller 502, in data communication with APs 504, 506. The communication link between controller 502 and APs 504, 506 may be suitably a wired, wireless and/or any combination of wired and wireless links. In an example embodiment, controller 502 acquires data from APs 504, 506 about available channels, such as other APs detected, for example AP 510 which may be a rogue AP or an AP operating on a different network. APs 504, 506 may also acquire data about interfering sources or noise, such as for example from interferer 508. Such data about interfering sources or noise may suitably comprise data indicating which channels are affected and/or the intensity of the interference. Based on this data, controller 502 can select candidate channels for APs 504, 506. In particular embodiments, controller 502 also assigns the channels, for example by using the rules or methods described herein.

In one example, APs 504, 506 may initially select and align operating channels. Once operational, controller 502 may verify the selected channels and channel alignment. Controller 502 may subsequently select new channels and/or new channel alignments for one or more of APs 504, 506. Controller 502 communicates the new channels and/or alignments to AP 504 and/or 506 which are responsive to change to the new channels and/or alignment.

The techniques described herein allows for adaptively assigning channels and selecting the primary channel for 802.11ac and 802.11n APs in a WLAN deployment. Particular attention is given to coexistence scenarios between APs because the wide bandwidth of 802.11ac APs would increase the likelihood of OBSSs at a deployment site. An adaptive penalty/bias value for primary channel misalignment based on the level of RSSI is added. Conclusions from analysis and simulations for favorable coexistence conditions have determined that interference can be minimized and constructive (fair) channel access can be enforced when these techniques are used.

These techniques allow existing WLAN equipment to work with the newer advanced IEEE 802.11ac APs by fostering constructive coexistence between 802.11ac and 802.11a/b/g/n BSSs that belong to the same deployment or are rogues, so that interference among them is minimized. The adaptive penalty/bias values for primary channel misalignment are based on the level of RSSI enhances coexistence between 802.11ac APs, as well as between 802.11ac APs and non-802.11ac APs.

Described above are examples. The concepts described herein may be embodied in other specific forms without departing from the spirit or essential characteristics thereof. The foregoing examples are therefore to be considered in all respects illustrative and not meant to be limiting. Accordingly, it is intended to embrace all such alterations, modifications and variations that fall within the spirit and scope of any claims filed in applications claiming priority hereto interpreted in accordance with the breadth to which they are fairly, legally and equitably entitled.

What is claimed is:

1. A method comprising:
computing metrics for at least one set of radio frequency (RF) channels, wherein the set of RF channels comprises at least two RF channels in a frequency band that are available for use by a wireless network for a wider bandwidth mode of operation that combines bandwidth of two or more RF channels, wherein the metrics are based on activity from devices in the set of RF channels;
determining alignment of individual primary and secondary RF channels in the set of RF channels for operation of at least first and second wireless networks, at least one of which operates in a wider bandwidth mode, wherein a primary channel is a set of one or more RF channels that is a smaller denomination of RF channels used by a wireless network when it is not operating in a wider bandwidth mode and a secondary channel is one or more RF channels used in conjunction with a primary channel when a wireless network is operating in a wider bandwidth mode;
applying to the metrics a bias for each RF channel that is a member of the set of RF channels for a primary channel depending on alignment of primary and secondary channels of the respective first wireless network and second wireless network to produce adjusted metrics, wherein the bias for each RF channel is computed from a receive signal strength of the first wireless network relative to a clear channel access threshold of a secondary channel of the second wireless network based on a piecewise linear transfer function; and
assigning RF channels to a primary channel and at least two secondary channels for the first wireless network or the second wireless network based on the adjusted metrics.

2. The method of claim 1, wherein applying comprises applying a first bias value in order to bias against assignment of primary and secondary channels for the first wireless network that would result in a primary channel of the first wireless network coinciding with a secondary channel of the second wireless network and a secondary channel of the first wireless network coinciding with a primary channel of the second wireless network.

3. The method of claim 2, wherein applying comprises applying a second bias value in order to bias against assignment of primary and secondary channels for the first wireless network that would result in a primary channel of the first wireless network coinciding with a secondary channel of the second wireless network, which secondary channel of the second wireless network comprises two or more RF channels aggregated together, wherein the first bias value is greater than the second bias value.

4. The method of claim 3, wherein applying comprises applying a third bias value against assignment of primary and secondary channels for the first wireless network that would result in a primary channel of the first wireless network coinciding with a primary channel of the second wireless network and a secondary channel of the first wireless network coinciding with a secondary channel of the second wireless network, wherein the third bias value is less than or equal to the second bias value.

5. The method of claim 4, wherein the first wireless network and the second wireless network are managed by the same management entity.

6. The method of claim 4, wherein the second wireless network is managed by a different management entity than that used to manage the first wireless network.

7. The method of claim 4, wherein computing the first, second and third bias values is based on a curve having an elongated peak value region.

8. The method of claim 1, wherein applying comprises applying bias values to channel assignments depending on adjacency of primary and secondary channels of the first wireless network with respect to primary and secondary channels of the second wireless network.

9. The method of claim 8, wherein applying comprises applying a first bias value against assignment of a secondary channel of the first wireless network to an RF channel that is adjacent to a secondary channel of the second wireless network that is operating in a wider bandwidth mode, and applying a second bias value against assignment of either a primary channel of the first wireless network that is adjacent to a secondary channel of the second wireless network or a primary channel of the second wireless network that is adjacent to a secondary channel of the first wireless network.

10. The method of claim 9, wherein the second bias value is less than or equal to the first bias value, and the first wireless network is an IEEE 802.11n wireless network and the second wireless network is an IEEE 802.11ac wireless network.

11. The method of claim 9, wherein the first wireless network and the second wireless network are managed networks.

12. The method of claim 9, wherein either of the first wireless network or the second wireless networks is managed by a different management entity.

13. The method of claim 1, further comprising normalizing the adjusted metrics by applying weights to the adjusted metrics to emphasize selection of primary channels.

14. The method of claim 13, wherein normalizing comprises computing a weighted average of primary and secondary channels by applying a greater weight for selection of a primary channel over secondary channels and such that secondary channels are given progressively less weight as their bandwidth increases.

15. The method of claim 1, wherein assigning comprises assigning multiple RF channels to wireless networks so as to allow a bandwidth needed to support the highest data rates capable by a wireless network.

16. The method of claim 1, wherein applying comprises applying a bias to assign the first wireless network to an RF channel not required for dynamic frequency selection when the second wireless network neighboring the first wireless network is operating on an RF channel that is required for dynamic frequency selection.

17. The method of claim 16, wherein applying comprises applying a bias with a greater value in assigning the first wireless network to an RF channel not required for dynamic frequency selection if the second wireless network and one or more additional wireless networks neighboring the first wireless network are operating on RF channels requiring dynamic frequency selection.

18. The method of claim 1, wherein computing metrics comprises computing, for each individual channel in the set of channels, a metric based on one or more of: ambient noise floor, receive signal strength from other wireless networks, receive signal strength that would be contributed to the set of channels, and receive signal strength associated with activity of unidentified RF signals.

19. The method of claim 1, wherein applying comprises applying the bias so as to bias against channel assignments based on resulting relative interference level.

20. One or more non-transitory computer readable storage media encoded with software comprising computer executable instructions and when the software is executed operable to:

compute metrics for at least one set of radio frequency (RF) channels, wherein the set of RF channels comprises at least two RF channels in a frequency band that are available for use by a wireless network for a wider bandwidth mode of operation that combines bandwidth of two or more RF channels, wherein the metrics are based on activity from devices in the set of RF channels;

determine alignment of individual primary and secondary RF channels in the set of RF channels for operation of at least first and second wireless networks, at least one of which operates in a wider bandwidth mode, wherein a primary channel is a set of one or more RF channels that is a smaller denomination of RF channels used by a wireless network when it is not operating in a wider bandwidth mode and a secondary channel is one or more RF channels used in conjunction with a primary channel when a wireless network is operating in a wider bandwidth mode;

apply to the metrics a bias for each RF channel that is a member of the set of RF channels for a primary channel depending on alignment of primary and secondary channels of the respective first wireless network and second wireless network to produce adjusted metrics, wherein the bias for each RF channel is computed from a receive signal strength of the first wireless network relative to a clear channel access threshold of a secondary channel of the second wireless network based on a piecewise linear transfer function; and assign RF channels to a primary and at least two secondary channels for the first wireless network or the second wireless network based on the adjusted metrics.

21. The computer readable storage media of claim 20, wherein the instructions for applying comprise instructions operable to:

apply a first bias value in order to bias against assignment of primary and secondary channels for the first wireless network that would result in a primary channel of the first wireless network coinciding with a secondary channel of the second wireless network and a secondary channel of the first wireless network coinciding with a primary channel of the second wireless network;

apply a second bias value in order to bias against assignment of primary and secondary channels for the first wireless network that would result in a primary channel of the first wireless network coinciding with a secondary channel of the second wireless network, which secondary channel of the second wireless network comprises two or more RF channels aggregated together, wherein the first bias value is greater than the second bias value; and apply a third bias value against assignment of primary and secondary channels for the first wireless network that would result in a primary channel of the first wireless network coinciding with a primary channel of the second wireless network and a secondary channel of the first wireless network coinciding with a secondary channel of the second wireless network, wherein the third bias value is less than or equal to the second bias value.

22. The computer readable storage media of claim 20, wherein the instructions operable to apply comprise instructions operable to apply bias values to channel assignments depending on adjacency of primary and secondary channels of the first wireless network with respect to primary and secondary channels of the second wireless network.

23. The computer readable storage media of claim 22, wherein the instructions operable to apply comprise instructions operable to apply a first bias value against assignment of a secondary channel of the first wireless network to an RF channel that is adjacent to a secondary channel of the second wireless network that is operating in a wider bandwidth mode, and applying a second bias value against assignment of either a primary channel of the first wireless network that is adjacent to a secondary channel of the second wireless network or a primary channel of the second wireless network that is adjacent to a secondary channel of the first wireless network.

24. The computer readable storage media of claim 20, further comprising instructions operable to normalize the adjusted metrics by applying weights to the adjusted metrics to emphasize selection of primary channels.

25. The computer readable storage media of claim 20, wherein the instructions operable to assign comprise instructions operable to assign multiple RF channels to wireless networks so as to allow a bandwidth needed to support the highest data rates capable by a wireless network.

26. The computer readable storage media of claim 20, wherein the instructions operable to apply comprise instructions operable to apply the bias so as to bias against channel assignments based on resulting relative interference level.

27. An apparatus comprising:
a network interface unit configured to enable communications over a network;
a processor coupled to the network interface unit, wherein the processor is configured to:
compute metrics for at least one set of radio frequency (RF) channels, wherein the set of RF channels comprises at least two RF channels in a frequency band that are available for use by a wireless network for a wider bandwidth mode of operation that combines bandwidth of two or more RF channels, wherein the metrics are based on activity from devices in the set of RF channels;

determine alignment of individual primary and secondary RF channels in the set of RF channels for operation of at least first and second wireless networks, at least one of which operates in a wider bandwidth mode, wherein a primary channel is a set of one or more RF channels that is a smaller denomination of RF channels used by a wireless network when it is not operating in a wider bandwidth mode and a secondary channel is one or more RF channels used in conjunction with a primary channel when a wireless network is operating in a wider bandwidth mode;

apply to the metrics a bias for each RF channel that is a member of the set of RF channels for a primary channel depending on alignment of primary and secondary channels of the respective first wireless network and second wireless network to produce adjusted metrics, wherein the bias for each RF channel is computed from a receive signal strength of the first wireless network relative to a clear channel access threshold of a secondary channel of the second wireless network based on a piecewise linear transfer function; and assign RF channels to a primary channel and at least two secondary channels for the first wireless network or the second wireless network based on the adjusted metrics.

28. The apparatus of claim 27, wherein the processor operable to:
apply a first bias value in order to bias against assignment of primary and secondary channels for the first wireless network that would result in a primary channel of the first wireless network coinciding with a secondary channel of the second wireless network and a secondary channel of the first wireless network coinciding with a primary channel of the second wireless network;

apply a second bias value in order to bias against assignment of primary and secondary channels for the first wireless network that would result in a primary channel of the first wireless network coinciding with a secondary channel of the second wireless network, which secondary channel of the second wireless network comprises two or more RF channels aggregated together, wherein the first bias value is greater than the second bias value; and apply a third bias value against assignment of primary and secondary channels for the first wireless network that would result in a primary channel of the first wireless network coinciding with a primary channel of the second wireless network and a secondary channel of the first wireless network coinciding with a secondary channel of the second wireless network, wherein the third bias value is less than or equal to the second bias value.

29. The apparatus of claim 27, wherein the processor is operable to apply bias values to channel assignments depending on adjacency of primary and secondary channels of the first wireless network with respect to primary and secondary channels of the second wireless network.

30. The apparatus of claim 29, wherein the processor is operable to apply a first bias value against assignment of a secondary channel of the first wireless network to an RF channel that is adjacent to a secondary channel of the second wireless network that is operating in a wider bandwidth mode, and apply a second bias value against assignment of either a primary channel of the first wireless network that is adjacent to a secondary channel of the second wireless network or a primary channel of the second wireless network that is adjacent to a secondary channel of the first wireless network.

31. The apparatus of claim 27, wherein the processor is further operable to normalize the adjusted metrics by applying weights to the adjusted metrics to emphasize selection of primary channels.

32. The apparatus of claim 27, wherein the processor is operable to assign multiple RF channels to wireless networks so as to allow a bandwidth needed to support the highest data rates capable by a wireless network.

33. The apparatus of claim 27, wherein the processor is operable to apply the bias so as to bias against channel assignments based on resulting relative interference level.

34. A method comprising:
computing metrics for at least one set of radio frequency (RF) channels, wherein the set of RF channels comprises at least two RF channels in a frequency band that are available for use by a wireless network for a wider bandwidth mode of operation that combines bandwidth of two or more RF channels, wherein the metrics are based on activity from devices in the set of RF channels;

determining alignment of individual primary and secondary RF channels in the set of RF channels for operation of at least first and second wireless networks, at least one of which operates in a wider bandwidth mode, wherein a primary channel is a set of one or more RF channels that is a smaller denomination of RF channels used by a wireless network when it is not operating in a wider bandwidth mode and a secondary channel is one or more RF channels used in conjunction with a primary channel when a wireless network is operating in a wider bandwidth mode;

applying to the metrics a bias for each RF channel that is a member of the set of RF channels for a primary channel depending on alignment of primary and secondary channels of the respective first wireless network and second wireless network to produce adjusted metrics;

assigning RF channels to a primary channel and at least two secondary channels for the first wireless network or the second wireless network based on the adjusted metrics;

normalizing the adjusted metrics by applying weights to the adjusted metrics to emphasize selection of primary channels, wherein normalizing comprises computing a weighted average of primary and secondary channels by applying a greater weight for selection of a primary channel over secondary channels and such that the secondary channels are given progressively less weight as the bandwidth increases.

35. The method of claim 34, wherein the first wireless network and the second wireless network are managed by a single management entity.

36. The method of claim 34, wherein the second wireless network is managed by a different management entity than that used to manage the first wireless network.

* * * * *